United States Patent [19]

Lin

[11] Patent Number: 5,543,863
[45] Date of Patent: Aug. 6, 1996

[54] EYE PROTECTING MASK OF COMPUTER VIDEO DISPLAY

[75] Inventor: Jui-Ming Lin, Taichung, Taiwan

[73] Assignee: Three Soma Technology Co., Ltd., Taichung, Taiwan

[21] Appl. No.: 375,702

[22] Filed: Jan. 20, 1995

[51] Int. Cl.⁶ ..................................................... H04N 5/72
[52] U.S. Cl. ........................ 348/835; 359/609; 359/614
[58] Field of Search .................................... 348/834, 835, 348/832; 313/474; 359/609, 614; 362/293, 455

[56] References Cited

U.S. PATENT DOCUMENTS

| | | | |
|---|---|---|---|
| 5,227,916 | 7/1993 | Theirl | 359/609 |
| 5,404,181 | 4/1995 | Hung | 348/835 |
| 5,448,405 | 9/1995 | Clausen et al. | 359/609 |

Primary Examiner—Scott A. Rogers
Attorney, Agent, or Firm—Browdy and Neimark

[57] ABSTRACT

An eye protecting mask of a video display comprises a frame and an adjustment device. The frame is provided centrally in the top side thereof with a recessed portion which is provided respectively in the inner walls of two sides thereof with a predetermined number of retaining slots and with an opening adjacent to the retaining slots. The adjustment device comprises a base and a pivoting member capable of swiveling on a pivot and corresponding in location to the recessed portion of the frame. The pivoting member is provided respectively at both ends thereof with a retaining portion and a cut adjacent to the retaining portion. The pivoting member is fitted into the recessed portion of the frame such that the two retaining portions of the pivoting member are engaged with the retaining slots of the frame so as to locate properly the eye protecting mask in front of the video display.

2 Claims, 4 Drawing Sheets

5,543,863

EYE PROTECTING MASK OF COMPUTER VIDEO DISPLAY

FIELD OF THE INVENTION

The present invention relates generally to an eye protecting mask of the computer video display, and more particularly to an adjustable eye protecting mask of the computer video display.

BACKGROUND OF THE INVENTION

The computer video display is generally covered with a mask for protecting the eyes of a computer operator from radiation emitted by the computer. As shown in FIG. 1, a conventional computer video display 4 is provided with a frame 1 for mounting an eye protecting mask. The frame 1 is provided respectively at the top edges of both sides thereof with an L-shaped rod 2 which is in turn provided at the free end thereof with a seat piece 3. The conventional eye protecting mask often fails to cover entirely the computer video display 4 in view of the fact that the rod 2 is not adjustable in length and that the computers are provided with video displays of various sizes. In addition, the conventional eye protecting mask can not be turned around to facilitate the cleaning or the adjusting of the video display 4. In other words, the conventional eye protecting mask must be removed before the cleaning or the adjusting of the computer video display 4 is done.

An improved eye protecting mask of the computer video display is currently available. Such an eye protecting mask is adjustable so as to cover entirely the computer video displays of various sizes. However, the eye protecting mask must be first detached from the computer video display 4 before the adjusting of the eye protecting mask is done.

SUMMARY OF THE INVENTION

It is therefore the primary objective of the present invention to provide an eye protecting mask of the computer video display, which can be adjustably mounted so as to cover entirely the computer video displays of various sizes.

It is another objective of the present invention to provide an eye protecting mask of the computer video display, which can be turned around to facilitate the cleaning and the adjusting of the computer video display.

The foregoing objectives of the present invention are attained by an eye protecting mask of the computer video display, which comprises a frame for mounting an eye protecting mask and an adjustment device. The frame is provided centrally in the top side thereof with a recessed portion which is in turn provided respectively in the inner walls of two sides thereof with a predetermined number of retaining slots and with an opening adjacent to the retaining slots. The adjustment device comprises a base and a pivoting plate which is capable of swiveling and corresponding in location to the recessed portion of the frame. The pivoting plate is provided respectively at both ends thereof with a retaining portion and a cut adjacent to the retaining portion. The pivoting plate is fitted into the recessed portion of the frame such that the two retaining portions of the pivoting plate are engaged with two retaining slots of the frame so as to locate properly the eye protecting mask.

The foregoing objectives, features and functions of the present invention will be more readily understood upon a thoughtful deliberation of the following detailed description of the present invention in conjunction with the accompanying drawings.

DETAILED DESCRIPTION OF THE INVENTION

Figure 1:
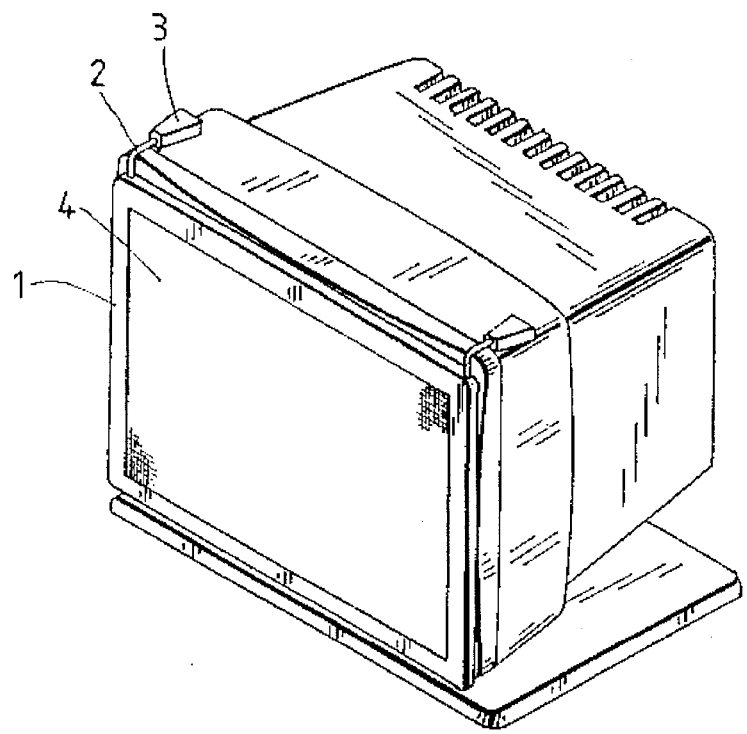
FIG. 1 shows a schematic view of a prior art eye protecting mask of the computer video display.
Figure 4:
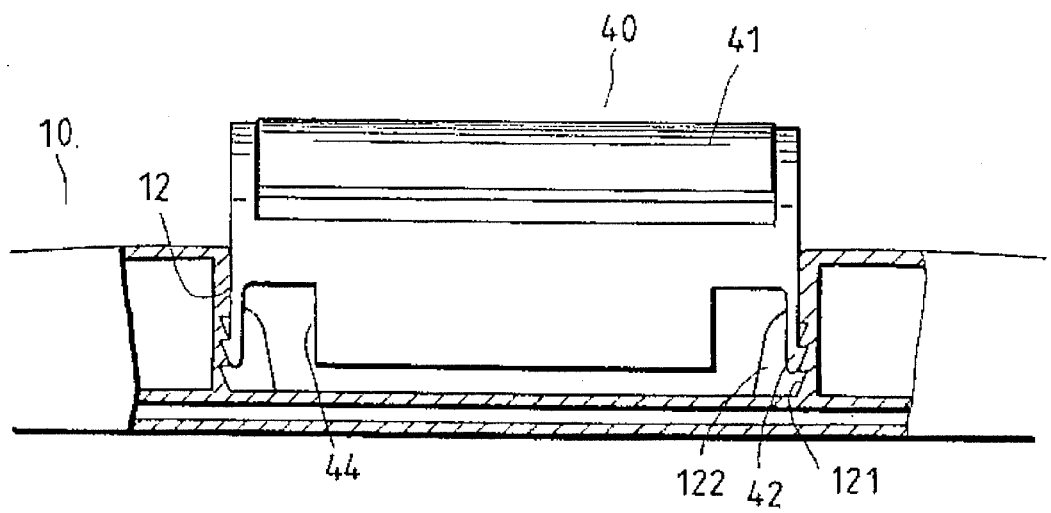
FIG. 4 is a partial sectional view of the present invention as shown in FIG. 2, showing the way by which the pivoting member and the frame of the present invention are held together.
Figure 2:
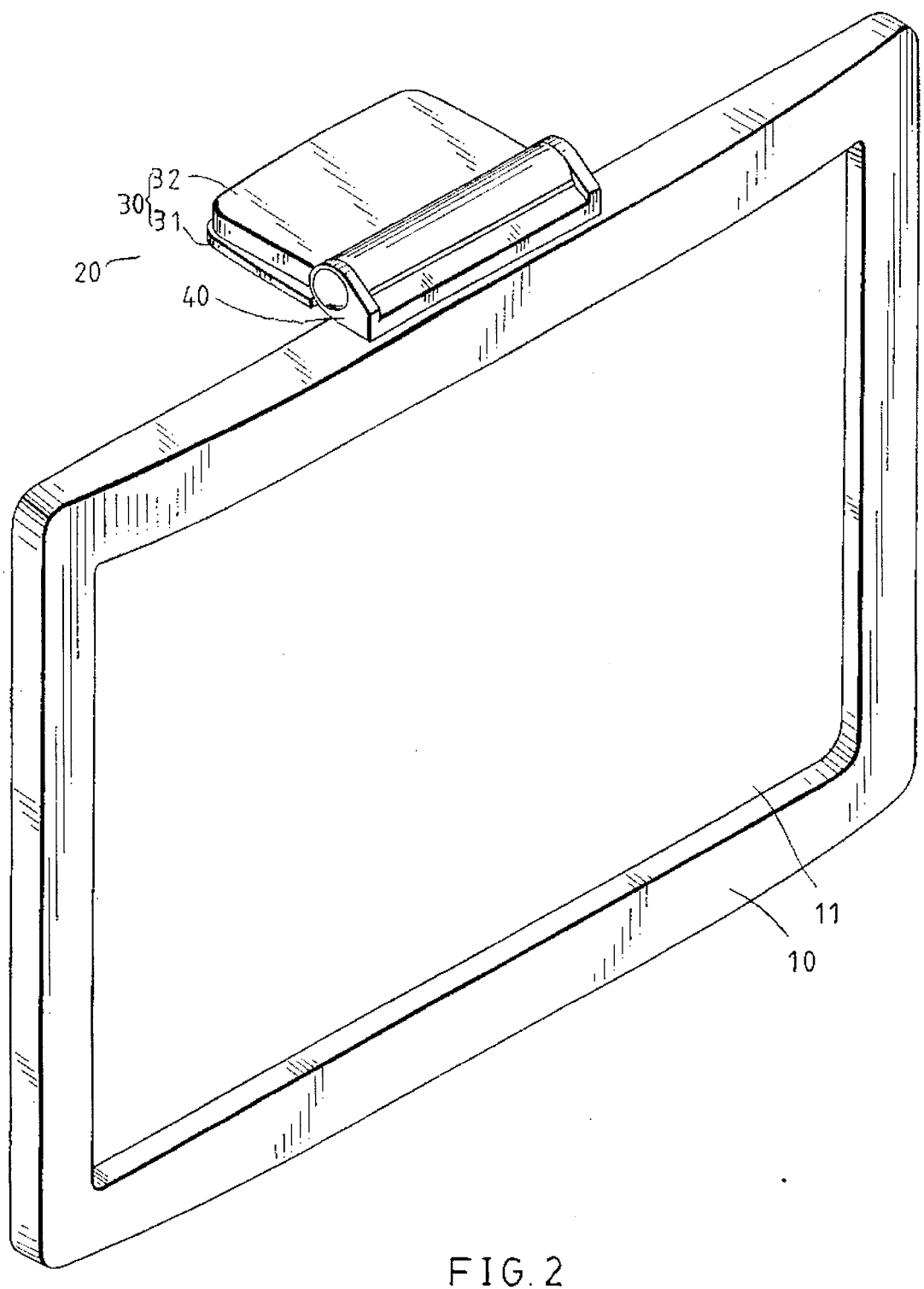
FIG. 2 shows a perspective view of an eye protecting mask of the computer video display according to the present invention.
Figure 3:
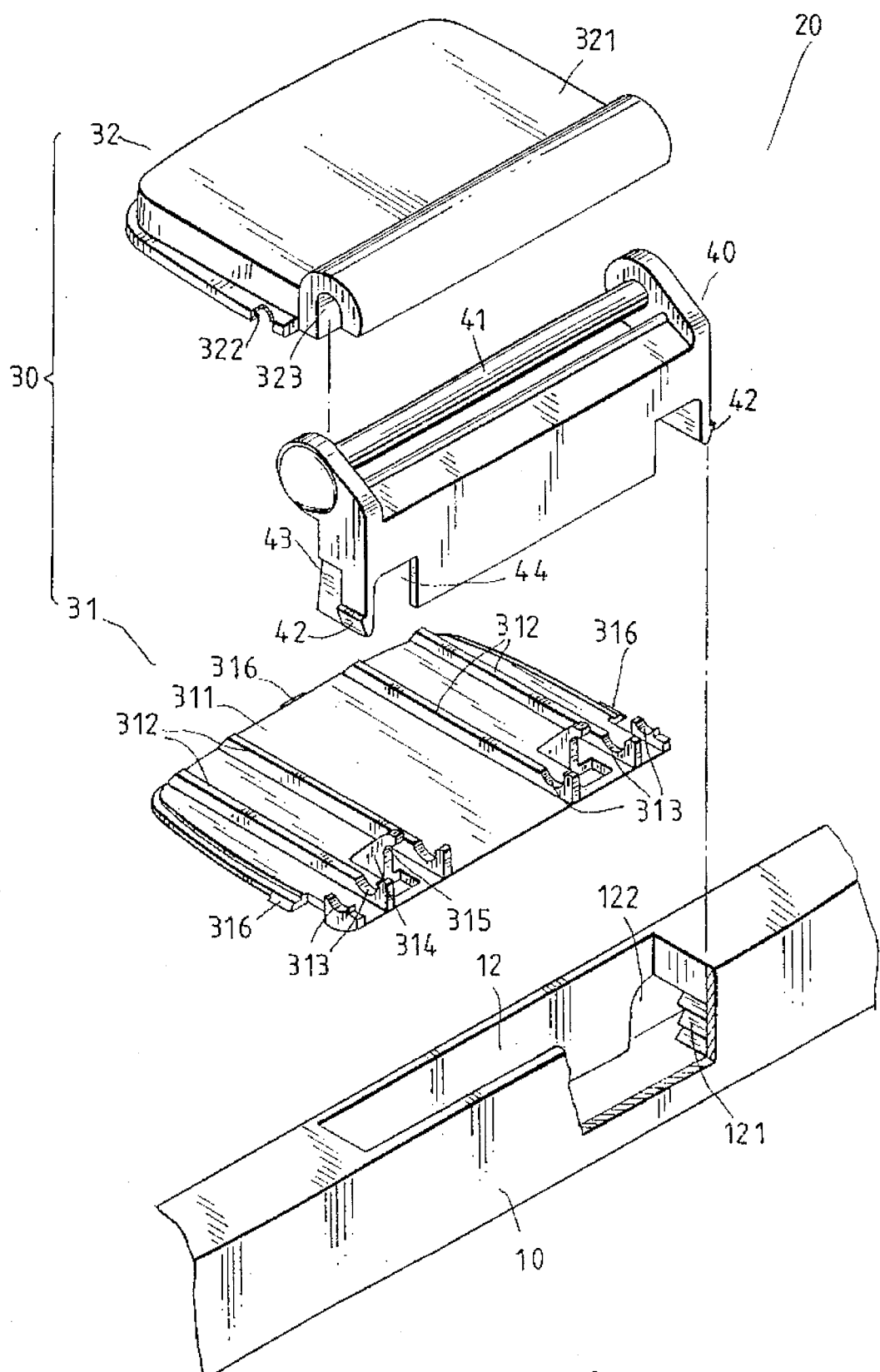
FIG. 3 shows an exploded view of the eye protecting mask of the computer video display as shown in FIG. 2.

As shown in FIGS. 2–5, the eye protecting mask of the present invention is intended to cover a television screen or a computer video display and is composed of the component parts, which are described explicitly hereinafter.

A frame 10 of a square construction is provided with an eye protecting mask 11 mounted thereto and is further provided centrally at the top side thereof with a recessed portion 12 which is in turn provided respectively in the inner walls of two sides thereof with a predetermined number of longitudinally-arranged retaining slots 121 and with an opening 122 adjacent to the retaining slots 121.

An adjustment device 20 is disposed at the top side of the television screen or the computer video display for holding the frame 10 and is made up of a base 30 and a pivoting member 40.

The base 30 has a lower body 31 and an upper body 32. The lower body 31 is made of a square plate 311 provided on the upper surface thereof with a predetermined number of horizontally-arranged ribs 312 which are provided respectively with a semicircular through hole 313. A bracing plate 314 is disposed between the two ribs 312 and is provided with an arcuate portion 315 which is shaped like one fourth of a circle and is corresponding in location to the semicircular through hole 313 of the rib 312. The square plate 311 is provided respectively at two sides thereof and the rear side thereof with an insertion block 316. The upper body 32 is joined with the lower body 31 and is made of a frame plate 321 which is of a hollow construction and is provided respectively at two sides thereof and the rear end thereof with an insertion hole 322 corresponding in location to and engageable with the insertion block 316 for holding together the upper body 32 and the lower body 31. The frame plate 321 is provided at the front end thereof with a through hole 323 of a semicircular construction and corresponding in location to the semicircular through hole 313 of the rib 312 and the arcuate portion 315 of the bracing plate 314 so as to form therewith a round hole 33.

The pivoting member 40 of an inverted U-shaped construction is corresponding in location to the recessed portion 12 of the frame 10 and is provided horizontally with a pivot 41 which is fastened pivotally to the round hole 33 formed together by the lower body 31 and the upper body 32. The pivoting member 40 is provided respectively at two sides thereof with a hooked retaining portion 42 and a flat press portion 43, which are corresponding respectively in location to the retaining slots 121 and the opening 122 of the recessed portion 12 of the frame 10. The pivoting member 40 is further provided with cuts 44 adjacent to the retaining portions 42 to enable the pivoting member 40 to deform flexibly, thereby bringing about a decrease in the distance between the two retaining portions 42 by pressing the two press portions 43. As a result, the pivoting member 40 can be fitted securely into the recessed portion 12 of the frame 10 such that the retaining portions 42 of the pivoting member 40 are engaged with the retaining slots 121 of the recessed portion 12.

In combination, the pivot 41 of the pivoting member 40 is first disposed in the through holes 313 of the ribs 312 of the lower body 31 and the arcuate portions 315 of the bracing plates 314. Thereafter, the insertion block 316 of the lower body 31 is engaged with the insertion hole 322 of the upper body 32 so as to join the lower body 31 and the upper body 32 together. The bottom portion of the base 30 is fastened securely to the top edge of the screen or the video display by means of an adhesive paper. The pivoting member 40 can be caused to swivel upwards and downwards in relation to the base 30. The press portions 43 of the pivoting member 40 are so pressed as to bring about a decrease in the distance between the two retaining portions 42 which are then engaged with two appropriately-located retaining slots 121 of the recessed portion 12 in order to locate the frame 10 appropriately.

Figure 5:
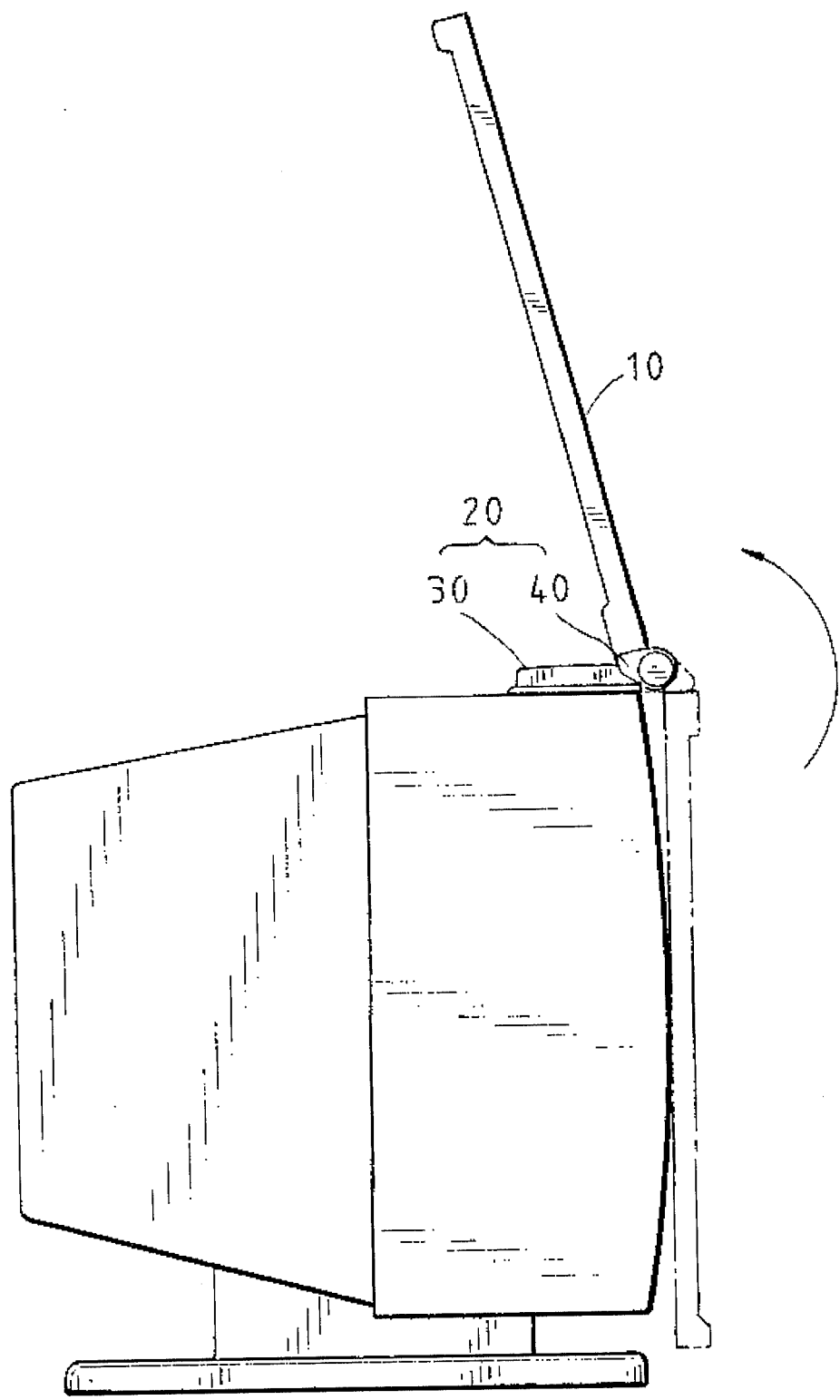
FIG. 5 shows a schematic view of the present invention at work.

The present invention can be used to cover entirely the television screen or the computer video display of any size by adjusting the position of the frame 10. The adjusting of the frame 10 is attained by pressing with fingers the press portions 43 of the pivoting member 40 via the openings 122 of the recessed portion 12 of the frame 10. As a result, the retaining portions 42 of the pivoting member 40 are caused to disengage the retaining slots 121 of the recessed portion 12. The frame 10 is then so adjusted as to locate appropriately in order to cover entirely a television screen or computer video display. The frame 10 can be rotated on the pivot 41 of the pivoting member 40 in such a manner that the frame 10 does not obstruct the cleaning or the adjusting of the screen or video display, as shown in FIG. 5.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. An eye protecting mask of a video display comprising a frame which is provided therein with an eye protecting means and is further provided at a top edge thereof with an adjustment device fastened pivotally thereto for adjusting the position of said frame;

wherein said frame is provided centrally in a top side thereof with a recessed portion which is in turn provided respectively in two inner side walls thereof with a predetermined number of retaining slots arranged longitudinally and with an opening adjacent to said retaining slots; and wherein said adjustment device comprises a base and a pivoting member fastened pivotally to a front end of said base such that said pivoting member is capable of swiveling on a pivot thereof upwards and downwards in relation to said base which is mounted in front of a video display, said pivoting member having an inverted U shape and being corresponding in location to said recessed portion of said frame, said pivoting member further having respectively at both ends thereof a retaining portion and a press portion which are corresponding respectively in location to said retaining slots and said opening of said recessed portion of said frame, said pivoting member still further having respectively at both end thereof with a cut adjacent to said retaining portion to facilitate the pressing of said press portion with finger so as to bring about a decrease in distance separating said two retaining portions, thereby enabling said pivoting member to be disposed in said recessed portion of said frame in such a manner that said two retaining portions of said pivoting member are engaged with said retaining slots of said recessed portion.

2. The eye protecting mask of a video display according to claim 1 wherein said base is made up of an upper body and a lower body which is provided thereon with a predetermined number of horizontally arranged ribs which are provided respectively with a semicircular through hole, said lower body further provided respectively on three sides thereof with an insertion block, said upper body provided respectively in three sides thereof with an insertion hole corresponding in location to and engageable with said insertion block of said lower body, said upper body having a semicircular through hole capable of forming a circular through hole with said semicircular through hole of each of said ribs of said lower body when said upper body is joined with said lower body, said circular through hole being so dimensioned as to receive therein said pivot of said pivoting member.

* * * * *